United States Patent
Kowalk

(10) Patent No.: US 10,106,201 B2
(45) Date of Patent: Oct. 23, 2018

(54) LOCATION-SPECIFIC DETECTION AND REMOVAL OF ICE OR DEBRIS IN A VEHICLE WHEEL WELL

(71) Applicant: Toyota Motor Engineering & Manufacturing North America, Inc., Erlanger, KY (US)

(72) Inventor: Christopher L. Kowalk, Farmington Hills, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 460 days.

(21) Appl. No.: 14/619,234

(22) Filed: Feb. 11, 2015

(65) Prior Publication Data

US 2016/0229460 A1 Aug. 11, 2016

(51) Int. Cl.
- *B60L 1/02* (2006.01)
- *B62D 25/16* (2006.01)
- *B60S 1/66* (2006.01)

(52) U.S. Cl.
CPC ............ *B62D 25/16* (2013.01); *B60L 1/02* (2013.01); *B60S 1/66* (2013.01)

(58) Field of Classification Search
CPC .............. B62D 25/16; B60S 1/66; B60L 1/02
USPC .......... 219/202, 203, 205; 134/123; 392/437
See application file for complete search history.

(56) References Cited

U.S. PATENT DOCUMENTS

| | | | |
|---|---|---|---|
| 5,573,686 A | 11/1996 | Lavicska | |
| 6,021,843 A | 2/2000 | Roach | |
| 6,189,808 B1* | 2/2001 | Daniels | B60S 1/0822 15/250.002 |
| 6,957,593 B1* | 10/2005 | Burns | G01N 29/11 73/866 |
| 9,096,983 B1* | 8/2015 | Mejia | E01H 10/007 |
| 9,375,737 B1* | 6/2016 | Zucker | B05B 7/1666 |
| 2002/0162580 A1* | 11/2002 | Hernandez | B60S 1/68 134/32 |
| 2003/0141289 A1 | 7/2003 | Fisher | |
| 2007/0044825 A1 | 5/2007 | Dalessandro | |
| 2008/0083719 A1* | 4/2008 | Bartucco | B60S 1/68 219/203 |
| 2008/0296279 A1* | 12/2008 | Forrest | B62D 25/16 219/202 |
| 2009/0014555 A1* | 1/2009 | Litvinov | B05B 1/3436 239/284.2 |
| 2013/0249299 A1* | 9/2013 | Shijo | H02J 5/005 307/80 |
| 2013/0283647 A1* | 10/2013 | Borges | B60T 8/176 37/227 |

(Continued)

*Primary Examiner* — Dana Ross
*Assistant Examiner* — Kuangyue Chen
(74) *Attorney, Agent, or Firm* — Christopher G. Darrow; Darrow Mustafa PC

(57) ABSTRACT

A system and method for removing snow and/or ice from one or more zones on an exterior surface of a vehicle are provided. The system includes a plurality of detection/removal zones, each zone having an associated snow sensor and an associated removal element. Detection of snow within any zone by the associated snow sensor automatically activates the associated snow removal element. The method includes detecting and removing snow automatically within at least one zone of a multi-zone removal system of the same type.

15 Claims, 3 Drawing Sheets

(56) References Cited

U.S. PATENT DOCUMENTS

2014/0140552 A1* 5/2014 Hui .................. G08B 3/00
381/309

* cited by examiner

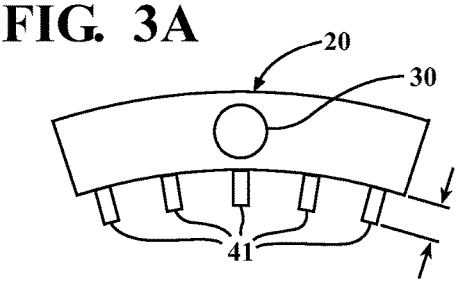
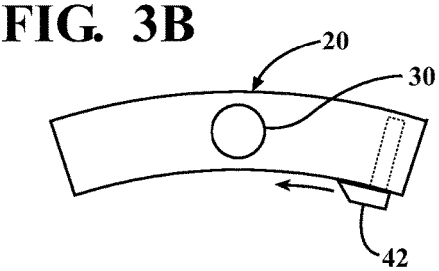
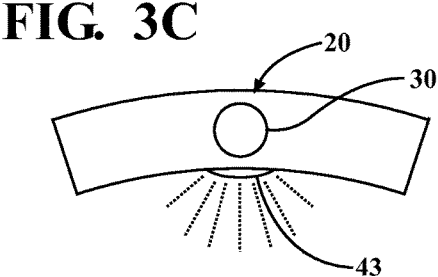
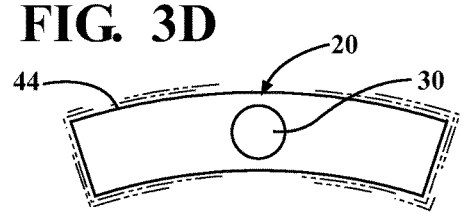
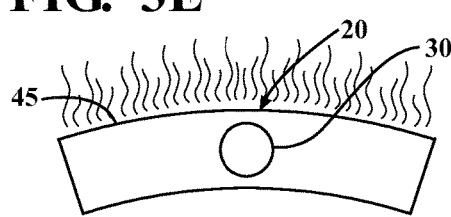
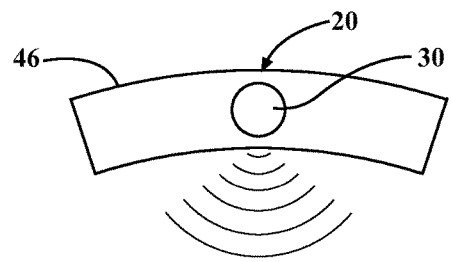
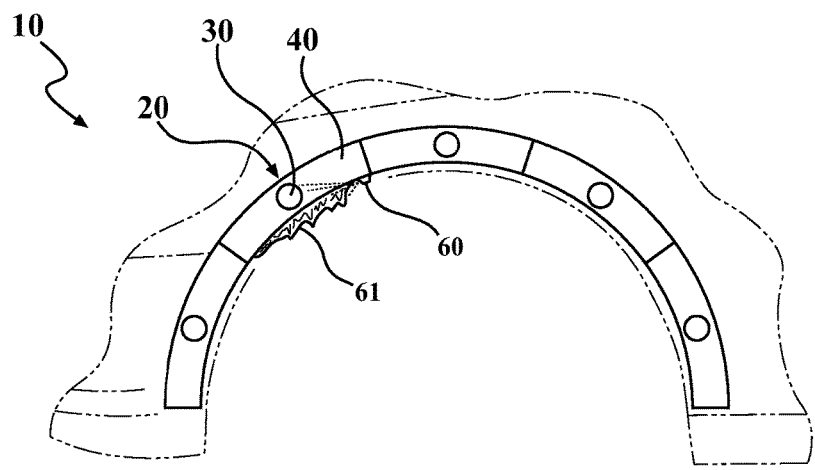

LOCATION-SPECIFIC DETECTION AND REMOVAL OF ICE OR DEBRIS IN A VEHICLE WHEEL WELL

TECHNICAL FIELD

The present disclosure relates in general to wheel well de-icers and debris removers, and specifically to systems and methods for automatic, targeted detection and removal of snow and ice in regions of the wheel well of an automotive vehicle.

BACKGROUND

Accumulation of frozen precipitate, such as ice or snow, or debris such as dirt, in the wheel wells or other exterior surfaces of a vehicle can potentially negatively impact a driver's ability to control the vehicle. Once the vehicle is parked in a garage or other vehicle storage area, any accumulated frozen precipitate is also likely to be deposited, where the deposited precipitate will contribute moisture, dirt, salt, and other unwanted material.

A system or method which can automatically detect frozen precipitate or debris on a vehicle exterior surface during a drive, identify its location on the exterior surface, and remove it with a targeted application of energy would improve driving safety in freezing conditions, improve cleanliness of parking areas and vehicle storage areas, and would achieve these goals with a high degree of energy efficiency and convenience to the user.

SUMMARY

The present disclosure provides a system and method for detecting and removing frozen precipitate from the wheel well or other exterior surface location of a vehicle.

In one aspect, a system for removing frozen precipitate or debris from a vehicle wheel well is provided having a plurality of detection/removal zones. Each detection/removal zone includes a frozen precipitate detection sensor (or "snow sensor") configured to detect the presence of accumulated frozen precipitate that is located in the detection/removal zone. Each detection/removal zone further includes a frozen precipitate removal element in signal communication with the detection sensor. The removal element is configured to remove accumulated frozen precipitate that is located in the detection/removal zone. Detection of accumulated frozen precipitate by the detection sensor causes the removal element to be activated. In some variations, multiple detection/removal zones are positioned in one wheel well.

In another aspect, a method for removing accumulated frozen precipitate from at least one detection/removal zone from among a plurality of detection/removal zones located in a vehicle wheel well is disclosed. The method includes a step of detecting accumulated frozen precipitate in a detection/removal zone using a detection sensor. The detection sensor is located in the detection/removal zone and is configured to detect the presence of accumulated frozen precipitate located in the detection/removal zone. The method also includes removing, using a removal element, the accumulated frozen precipitate located in the detection/removal zone. The removal element is located in the detection/removal zone and is configured to remove accumulated frozen precipitate located in the detection/removal zone. Detection of accumulated frozen precipitate by the detection sensor causes the removal element to be activated.

BRIEF DESCRIPTION OF THE DRAWINGS

Various aspects and advantages of the disclosure will become apparent and more readily appreciated from the following description of the various aspects taken in conjunction with the accompanying drawings, of which:

FIG. 3A is a schematic view of a detection/removal zone having a mechanical protrusion type of removal element;

FIG. 3B is a schematic view of a detection/removal zone having a mechanical abrasion type of removal element;

FIG. 3C is a schematic view of a detection/removal zone having a freezing point lowering type of removal element;

FIG. 3D is a schematic view of a detection/removal zone having an acoustic type of removal element;

FIG. 3E is a schematic view of a detection/removal zone having a conductive heating type of removal element;

FIG. 3F is a schematic view of a detection/removal zone having a radiative type of removal element; and FIG. 4 is a schematic view of a cleaning element.

DETAILED DESCRIPTION

The present disclosure describes systems and methods for the detection and removal of accumulated frozen precipitate exterior surfaces of a vehicle. In some instances, the exterior surfaces are located in a vehicle undercarriage, and in some instances are located within a single wheel well of the vehicle. The system can automatically detect and remove frozen precipitate, such as snow, from an exterior surface, such as a snow-affected portion of a wheel well, with no need for driver intervention The system can also operate at a an appreciable level of efficiency, since removal of frozen precipitate is activated only in regions where frozen precipitate is present.

The system includes snow detection/removal zones located in various useful locations on one or more external surfaces of a vehicle. Each zone has a snow detection device and a snow removal device that is activated in response to a positive signal from the detector. In this manner, each zone operates independently from each other zone, and snow removal is automatically initiated only when and where it is needed.

As the term is used herein, a "vehicle" can include any land-based motor vehicle such as a car, truck, van, SUV, bus, motorcycle, three-wheeled vehicle, trailer truck, semi-trailer truck, a trailer or semi-trailer, or any other land-based vehicle. In some variations, a vehicle can include an air-based vehicle such as an airplane or helicopter. In such latter variations, the system can be configured to remove frozen precipitate from an undercarriage, such as landing gear, or from any other surface where frozen precipitate can accumulate. In some cases, the term "vehicle" can refer particularly to an automobile.

Figure 1:
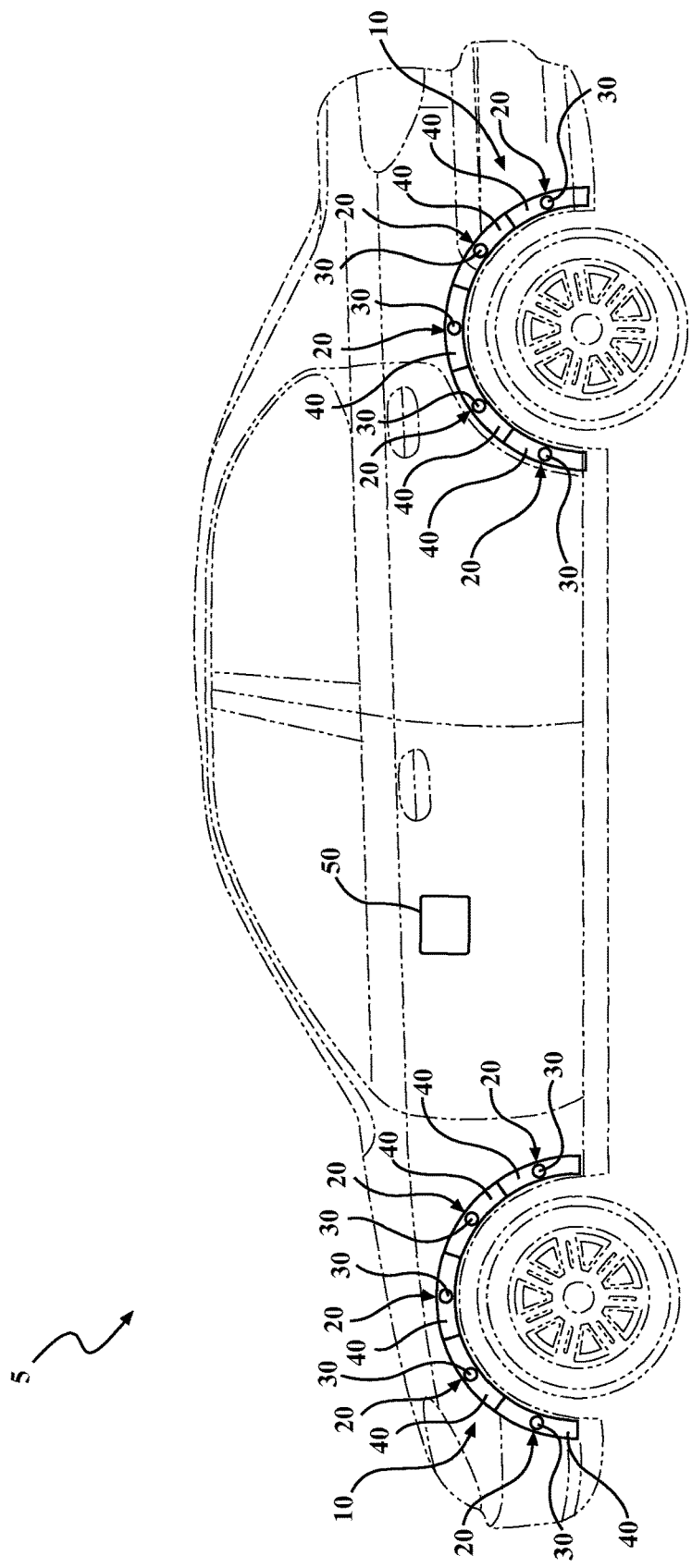
FIG. 1 is a schematic side view of a vehicle having a system for the detection and removal of accumulated frozen precipitate from the vehicle undercarriage.

Referring now to FIG. 1, an exemplary vehicle 5 is shown having a system 10 for removing frozen precipitate from a vehicle exterior surface. The phrase "vehicle exterior surface", as used herein, can refer to any exterior surface of a vehicle 5. In some implementations, it can refer more particularly to a vehicle undercarriage, such as an undercarriage of an automobile, another land-based vehicle, or an air-based vehicle. In some implementations, the phrase "vehicle exterior surface" can refer still more particularly to a wheel well of an automobile.

The system 10 has a plurality of detection/removal zones 20. The system 10 is configured to automatically detect the presence of accumulated frozen precipitate in any of the detection/removal zones 20, and then to remove the accumulated frozen precipitate from any detection/removal zone 20 in which it is detected. The phrase "accumulated frozen precipitate" as used herein generally refers to a composition that includes a component of frozen water, such as slush, snow, or ice that can accumulate in a wheel well or other regions of a vehicle 5 exterior surface during driving in freezing conditions.

Referring now to FIGS. 1 and 2(A-C), each detection/removal zone 20, 20A, 2B, 20C, 20D, and 20E includes a frozen precipitate detection sensor 30, 30A, 30B, 30C, 30D, and 30E, respectively. Each frozen precipitate detection sensor 30, 30A, 30B, 30C, 30D, and 30E is configured to detect the presence of accumulated frozen precipitate within the detection/removal zone 20, 20A, 20b, 20C, 20D, and 20E that is "associated with" (i.e. that includes) that frozen precipitate detection sensor 30, 30A, 30B, 30C, 30D, and 30E. This configuration can alternatively be stated as follows: each detection sensor 30 is configured to detect the presence of accumulated frozen precipitate within a detection area, the detection area generally being coterminous with the detection/removal zone 20 associated with that frozen precipitate detection sensor 30. For brevity, the phrase "snow sensor" will herein be used interchangeably with the phrase "frozen precipitate detection sensor", but is not intended to imply limitation to any particular type of accumulated frozen precipitate.

Non-limiting examples of devices that can be suitably used as snow sensors include electromagnetic (EM) wave sensors, temperature sensors, and acoustic sensors. EM wave sensors include any device that can continuously or periodically emit electromagnetic radiation, typically such as visible, IR or radio frequency, coupled with a photodetector positioned to detect absorption, reflection, or scattering of the emitted EM radiation. An acoustic sensor can be configured to detect changes in vibrational frequency of the vehicle exterior surface within the relevant detection/removal zone 20, the changes resulting from attachment of accumulated frozen precipitate within the detection/removal zone 20. In some instances, an acoustic sensor can include a sound wave emission/detection sensor, such as a Sonar type sensor. Temperature sensors can include digital thermometers, mechanical thermometers or other implements having a temperature-sensing function.

Certain varieties of EM wave sensors or acoustic sensors (particularly a Sonar type sensor, in the latter case) can operate in conjunction with a background map. Such a background map can include stored data pertaining to intensity and/or direction of reflected waves that should be present in the absence of frozen precipitate. Deviations from the background map in the reflected waves that are detected can then register as a positive detection of frozen precipitate. Threshold levels of deviation from the background map can be set to help avoid false-positive detections.

Each detection/removal zone 20, 20A, 20b, 20C, 20D, and 20E also includes a frozen precipitate removal element 40, 40A, 4Bb, 40C, 40D, and 40E configured to remove accumulated frozen precipitate within its associated detection/removal zone 20, 20A, 20b, 20C, 20D, and 20E. This configuration can alternatively be stated as follows: each frozen precipitate removal element 40 is configured to remove frozen precipitate from a removal area, the removal area being substantially coterminous with the detection/removal zone 20 associated with that frozen precipitate removal element 40.

For brevity, a frozen precipitate removal element 40 will be alternatively referred to herein as a "removal element". The removal element 40 can be reversibly alternated between an activated state and a deactivated state, or stated alternatively, can be activated or deactivated. In general, the removal element 40 is configured to remove accumulated frozen precipitate from the detection/removal zone 20 within which it is located when the removal element 40 is activated, and not when it is deactivated.

With reference to FIGS. 3(A-F) non-limiting examples of devices that can be suitably used as removal elements 40 include mechanical protrusion elements 41, mechanical abrasion elements 42, freezing point lowering elements 43, vibrational removal elements 44, conductive heating elements 45, and radiative elements 46.

A mechanical protrusion element 41 (FIG. 3A) can include one or more rods, plates or other parts which, upon activation, mechanically and temporarily protrudes from a portion of a vehicle exterior surface to push frozen precipitate off of the vehicle exterior surface. A mechanical abrasion element 42 (FIG. 3B) can include a moving part that scrapes or otherwise abrades accumulated frozen precipitate from the vehicle exterior surface. A freezing point lowering element 43 (FIG. 3C) can include a dispenser that applies a solute or solution to the frozen precipitate to lower the freezing point of the frozen precipitate and thereby cause its melting. A non-limiting example can be a sprayer similar to a windshield wash fluid sprayer.

A vibrational removal element 44 (FIG. 3D) can include any device that vibrates or emits acoustic waves. A conductive heating element 45 (FIG. 3E) can include a resistive heating element or in some cases an induction heating element. A radiative element 46 (FIG. 3F) can emit electromagnetic radiation such as IR or microwaves at a frequency configured to be absorbed by water, causing vibrational or rotational excitation of water molecules and thereby causing frozen precipitate to melt.

The aforementioned, exemplary types of suitable removal elements 40 can be categorized in three groups: thermal elements (including radiative elements 46 and conductive heating elements 45), mechanized elements (including mechanical protrusion elements 41, mechanical abrasion elements 42, and vibrational removal elements 44), and chemical (including freezing point lowering elements 43). It should be appreciated that these groups of removal element 40, including their various examples, can be used in combination with one another.

In some instances, a device can function as both a removal element 40 and a snow sensor 30. For example, an IR emission device can function as a snow sensor 30, perhaps when operating at a lower intensity, and then function as a removal element 40, perhaps when operating at a higher intensity.

A removal element 40 can be characterized as having an output magnitude. The output magnitude describes the degree of output, such as higher vs. lower temperature, amplitude of vibration, amplitude of EM emission, etc. that results from the activated state. For example, a conductive heating element 46 that produces more heat, or achieves a higher temperature, has a greater output magnitude than does a conductive heating element that produces less heat, or achieves a lower temperature.

In some implementations, at least two removal elements 40 can be configured to have different output magnitudes. In some such implementations, differing output magnitude can be based on the position of the detection/removal zones 20 in which the removal elements are located. For example, in the illustration of FIG. 2A, detection/removal zone 20A can be regarded as a rearward zone if the adjacent wheel rotates in a clockwise direction during forward movement of the vehicle 5. Similarly, detection/removal zone 20E could be regarded as a forward zone in the same circumstance. In such a scenario, a rearward zone can have a removal element 40A with a greater amplitude output magnitude as compared to the removal element 40E of a forward zone, since the rearward zone could be expected to accumulate more frozen precipitate due to the motion of the wheel.

In general, detection of accumulated frozen precipitate within the detection radius of a snow sensor 30 will cause activation of the associated removal element 40. In general, a snow sensor 30 and a removal element 40 are "associated" if they are included in the same detection/removal zone 20. Each is also associated with the detection/removal zone 20 in which it is located.

Figure 2A:
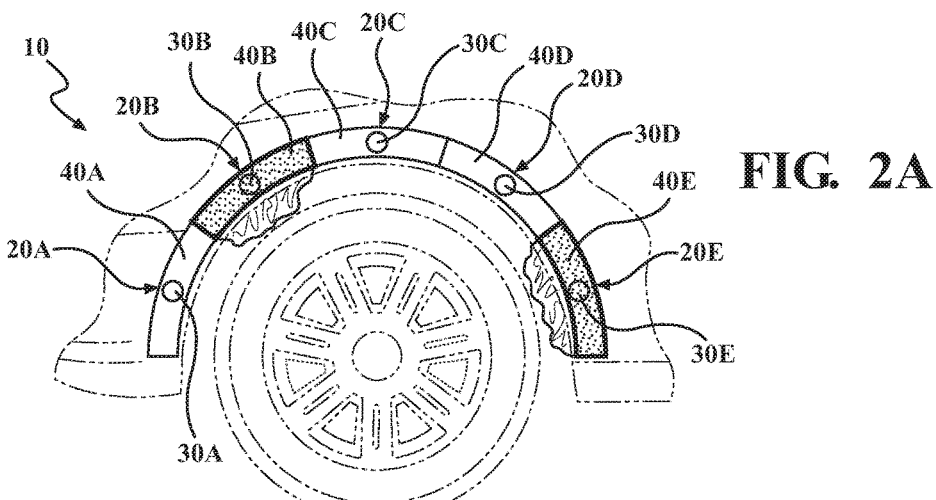
FIG. 2A is a close-up schematic side view of a wheel well portion of the vehicle undercarriage of FIG. 1 having five detection/removal zones located in a wheel well and shown with removal elements in a deactivated state with accumulated frozen precipitate present.
Figure 2B:
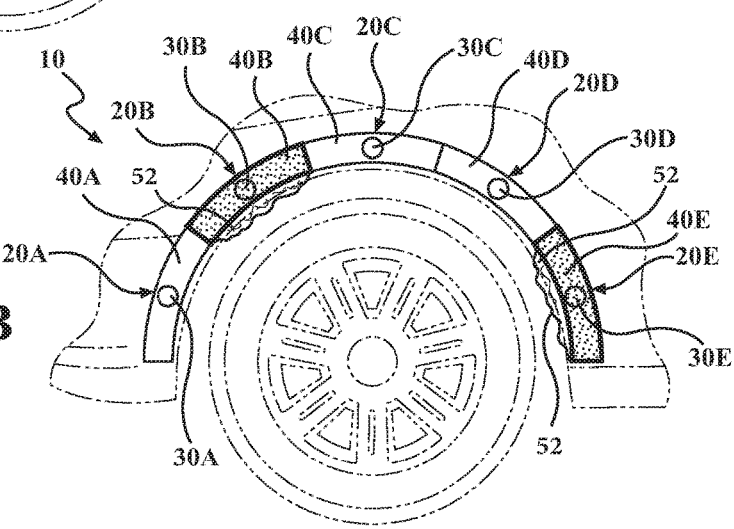
FIG. 2B is a close-up schematic side view of FIG. 2A with two of the removal elements in an activated state and the accumulated frozen precipitate partially removed.
Figure 2C:
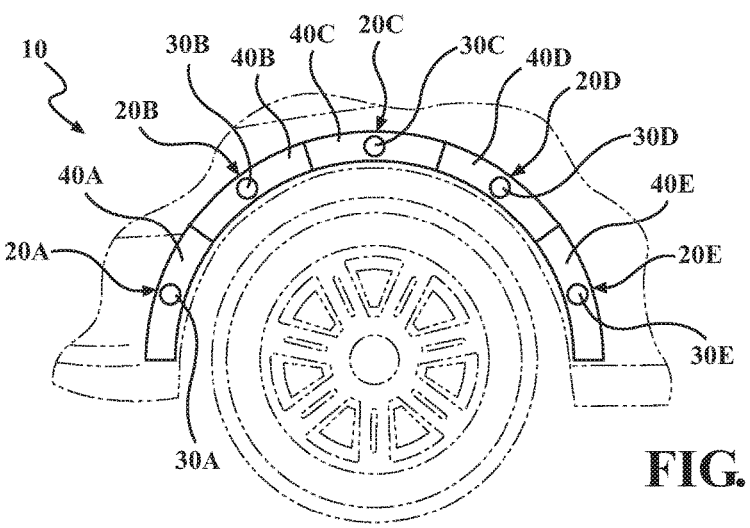
FIG. 2C is a close-up schematic side view of FIG. 2A with all removal elements in a deactivated state and the accumulated frozen precipitate now fully removed.

In the example of FIG. 2A, snow sensors 30B and 30E detect the presence of accumulated frozen precipitate in detection/removal zones 20B and 20E. This leads to activation of removal elements 40B and 40E, resulting in melting of the accumulated frozen precipitate in detection/removal zones 20B and 20E as shown in FIGS. 2B and 2C. It is to be appreciated that, while the examples of FIGS. 1 and 2(A-C) show a plurality of five detection/removal zones 20 (or 20A, 20B, 20C, 20D, and 20E) in a wheel well, this is for exemplary purposes only and that the number of detection/removal zones 20 included in the system 10 can be any number greater than one.

Generally, the removal element 40 and the snow sensor 30 will be in signal communication with one another, where "signal communication" refers to electrical communication (i.e. "wired communication") or electromagnetic communication (i.e. wireless communication). Such signal communication can be direct or indirect. In instances where signal communication is indirect, the removal element 40 and the snow sensor 30 can be in signal communication with one another via a controller 50. In such instances, the controller 50 can be configured to receive data from a snow sensor 30 located in any detection/removal zone 20. The controller can be further configured to transmit instructions directing activation of a removal element 40 that is located in the detection/removal zone 20 of the snow sensor 30 from which the data were received.

In some instances, and with reference to FIG. 4, the system 10 can include one or more cleaning elements 60, configured to remove residual debris 61, such as dirt or other material not efficiently removed by the removal element 40, from one or more detection/removal zones 20. Inclusion of a cleaning element 60 in the system 10 can be of particular use in instances where the system 10 includes snow sensors 30 of the EM wave sensor type, or of the Sonar type of acoustic element. Because the presence of residual debris 61 can potentially compromise the effectiveness of such a snow sensor 30, a cleaning element 60 can be useful to maintain such varieties of snow sensor 30 in efficient operating condition.

In the non-limiting example of FIG. 4, the cleaning element 60 is a spray element, configured to spray a gas, aerosol, solvent, or solution at the one or more detection/removal zones 20 having residual debris 61. It will be appreciated that each detection/removal zone 20 can be configured with its own cleaning element 60, or one cleaning element 60 can be configured to remove residual debris 61 from more than one detection/removal zone 20.

When present, such a cleaning element 60 can be configured for automatic operation. In one non-limiting example, a snow sensor 30 may continue to give a positive detection result after continued or repeated activation of the associated removal element 40 for a particular lengthy duration. This circumstance can be taken as an indication by the controller 50, or other system 10 component, that residual debris 61 is present and is causing a false positive detection. Such indication could then automatically activate an appropriately positioned cleaning element 60. In another non-limiting example, if an EM wave sensor or Sonar type, acoustic sensor utilizes deviation from a background map to detect the presence of frozen precipitate, certain patterns in shape or repetition of deviation from the background map can be taken to indicate the presence of residual debris 61. Again, such indication can automatically activate an appropriately positioned cleaning element 60.

It is to be appreciated that in implementations of a system 10 that include one or more removal elements 40 that are mechanized elements or chemical elements, the system 10 can be adapted for the removal of dirt, mud, or other debris from a vehicle 5 exterior surface. For example, and in partial reference to FIG. 2B, the accumulated frozen precipitate 52 can instead be accumulated debris such as dirt or mud. Removal elements 40 that are mechanical elements or chemical elements can be used to remove such accumulated debris. In such implementations having a chemical element, the chemical element can be a dispenser of pressurized or high velocity fluid, such as a cleaning solution. In some such instances, a cleaning element 60 can be regarded as a type of removal element 40. The entirety of the present disclosure describes such implementations of the system 10, by replacement of the phrase "frozen precipitate" with the term "debris" and replacement of the phrase "snow sensor" with the phrase "debris sensor".

Also disclosed is a method for detecting and removing accumulated frozen precipitate from at least one of a plurality of detection/removal zones 20 located on a vehicle exterior surface. The method includes a step of detecting accumulated frozen precipitate in the at least one zone, using a snow sensor 30 positioned within the detection/removal zone 20. The method also includes a step of automatically removing the detected frozen precipitate from the detection/removal zone 20 using a removal element 40 located in the detection/removal zone. The detection/removal zone 20, the snow sensor 30, and the removal element 40 are as defined above, in all particulars.

In some instances, the method can be executed under the direction of a controller 50. In such instances, the controller 50 can be configured to receive data from a snow sensor 30 located in any detection/removal zone 20. The controller 50 can be further configured to transmit instructions directing activation of a removal element 40 that is located in the detection/removal zone 20 of the snow sensor 30 from which the data were received.

In some implementations, the disclosed method can further include a step of detecting residual debris 61 on a detection/removal zone 20, and a step of cleaning the detection/removal zone 20 on which residual debris 61 is detected. In such implementations, the cleaning step will typically be performed by a cleaning element 60, where the cleaning element 60 and residual debris 61 are as described above.

In some instances, the detecting residual debris and cleaning steps can be executed under the direction of a controller 50. In such instances, the controller 50 can be configured to receive debris-indicative data from a detection/removal zone 20. In one non-limiting example, such debris-indicative data can include data indicating that the removal element 40 located in the detection/removal zone 20 from which debris-indicative data were received has been subject to continuous or repeated activation. In another non-limiting example, such debris-indicative data can include certain patterns in repetition or in shape of deviation from a background map. This can particularly apply to a method in which one or more snow sensors 30 are configured to detect the presence of accumulated frozen precipitate, or the presence of residual debris 61, based on deviations in the patterns of reflected EM or sound waves as compared to a background map. As mentioned above with respect to the system 10, snow sensors 30 of this type can include any of an EM wave sensor and a Sonar-type of acoustic sensor.

Also in instances of the method that includes a detecting residual debris step and/or a cleaning step, as executed under the direction of a controller 50, the controller 50 can be configured to transmit instructions directing activation of a cleaning element 60 positioned to clean the detection/removal zone 20 from which debris-indicative data were received.

It will be appreciated that several elements and features have been described herein that are, or can be, applicable to multiple aspects of the present disclosure, such as the system 10 and the method. It should be understood that where particular elements have a common reference name in the context of multiple aspects, such as detection/removal zone 20, snow sensor 30, removal element 40, or controller 50, the features and descriptions of that element as recited in the context of one aspect are applicable to the context of any other aspect.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for removing frozen precipitate from a vehicle wheel well, the system comprising:
   a plurality of spatially separate and non-overlapping detection/removal zones located in the wheel well, each detection/removal zone having:
   a snow sensor configured to detect accumulated frozen precipitate located in the detection/removal zone;
   a removal element in signal communication with the snow sensor, the removal element configured to remove accumulated frozen precipitate located in the detection/removal zone when activated, the removal element comprising:
   a mechanical protrusion element comprising one or more rod, plate, or other part which, upon activation, mechanically and temporarily protrudes from a portion of a detection/removal zone to push frozen precipitate off of the detection/removal zone;
   a mechanical abrasion element comprising a moving part that scrapes or otherwise abrades accumulated frozen precipitate from the vehicle exterior surface; and
   a vibrational removal element that vibrates or emits acoustic waves;
   a cleaning element configured to remove residual dirt from the snow sensor in one or more spatially separated and non-overlapping detection/removal zones; and
   a controller configured to receive data from the snow sensor, and to transmit instructions directing activation of the removal element when the snow sensor detects accumulated frozen precipitate in the detection/removal zone.

2. The system as recited in claim 1, wherein the cleaning element is a spray element configured to spray a gas, aerosol, solvent, or solution at the one or more spatially separated and non-overlapping detection/removal zones.

3. The system as recited in claim 1, wherein the snow sensor comprises at least one of an electromagnetic (EM) wave sensor, and an acoustic sensor.

4. The system as recited in claim 1, wherein at least two removal elements have different output magnitudes.

5. A method for removing accumulated frozen precipitate from at least one of a plurality of detection/removal zones located in a vehicle wheel well, the method comprising:
   receiving, at a controller, data from at least one of a plurality of snow sensors, each snow sensor configured to detect accumulated frozen precipitate located in respective detection/removal zones, the data indicating a presence of accumulated frozen precipitate in the at least one detection/removal zone;
   transmitting, from the controller, instructions directing activation of a removal element that is configured to remove accumulated frozen precipitate located in the detection/removal zone from which the data were received, the removal element comprising:
   a mechanical protrusion element comprising one or more rod, plate, or other part which, upon activation, mechanically and temporarily protrudes from a portion of a detection/removal zone to push frozen precipitate off of the detection/removal zone;
   a mechanical abrasion element comprising a moving part that scrapes or otherwise abrades accumulated frozen precipitate from the vehicle exterior surface; and
   a vibrational removal element that vibrates or emits acoustic waves;
   removing the accumulated frozen precipitate in the detection/removal zone using the removal element located in the detection/removal zone;
   detecting residual dirt on at least one of the plurality of snow sensors; and
   cleaning the at least one snow sensor on which residual dirt is detected.

6. The method as recited in claim 5, further comprising:
   receiving debris-indicative data from any detection/removal zone from the plurality of detection removal zones; and
   transmitting instructions directing activation of a cleaning element positioned to clean the detection/removal zone from which debris-indicative data were received.

7. The method as recited in claim 6, wherein the cleaning element is a spray element configured to spray a gas, aerosol, solvent, or solution at the one or more detection/removal zones.

8. The method as recited in claim 5, wherein the snow sensor comprises any of an EM wave sensor, an acoustic sensor, and a temperature sensor.

9. A system for removing frozen precipitate from a vehicle wheel well, the system comprising:
- a plurality of detection/removal zones located in the wheel well, each detection/removal zone having:
  - a snow sensor configured to detect accumulated frozen precipitate located in the detection/removal zone when activated; and
  - a removal element in signal communication with the snow sensor, the removal element configured to remove accumulated frozen precipitate located in the detection/removal zone, the removal element comprising:
    - a mechanical protrusion element comprising one or more rod, plate, or other part which, upon activation, mechanically and temporarily protrudes from a portion of a detection/removal zone to push frozen precipitate off of the detection/removal zone;
    - a mechanical abrasion element comprising a moving part that scrapes or otherwise abrades accumulated frozen precipitate from the vehicle exterior surface; and
    - a vibrational removal element that vibrates or emits acoustic waves;
- a cleaning element configured to remove residual debris from the snow sensor in one or more detection/removal zones; and
- a controller configured to receive data from the snow sensor located in any detection/removal zone of the plurality of detection/removal zones; to transmit instructions directing activation of the removal element that is located in the detection/removal zone from which the data were received; to receive debris-indicative data from a detection/removal zone; and to transmit instructions directing activation of the cleaning element positioned to clean the detection/removal zone from which debris-indicative data were received,
wherein detection of accumulated frozen precipitate by the snow sensor causes the controller to activate the removal element.

10. The system as recited in claim 9, wherein the cleaning element is a spray element configured to spray a gas, aerosol, solvent, or solution at the one or more detection/removal zones.

11. The system as recited in claim 9, wherein the snow sensor comprises any of an electromagnetic (EM) wave sensor, an acoustic sensor, and a temperature sensor.

12. The system as recited in claim 9, wherein at least two removal elements have different output magnitudes.

13. The system as recited in claim 9, further comprising a first detection/removal zone having a first removal element and a first output magnitude, and a second detection/removal zone having a second removal element and a second output magnitude, wherein the first output magnitude is greater than the second output magnitude.

14. A system for removing accumulated debris from a vehicle wheel well, the system comprising:
- a plurality of detection/removal zones located in the wheel well, each detection/removal zone having:
  - a debris sensor configured to detect accumulated dirt located in the detection/removal zone; and
  - a cleaning element in signal communication with the debris sensor, the cleaning element configured to remove accumulated dirt located in the detection/removal zone when activated, the cleaning element comprising:
    - a mechanical protrusion element comprising one or more rod, plate, or other part which, upon activation, mechanically and temporarily protrudes from a portion of a detection/removal zone to push frozen precipitate off of the detection/removal zone;
    - a mechanical abrasion element comprising a moving part that scrapes or otherwise abrades accumulated frozen precipitate from the vehicle exterior surface; and
    - a vibrational removal element that vibrates or emits acoustic waves; and
- a controller configured to receive data from the debris sensor, and to transmit instructions directing activation of the cleaning element when the debris sensor detects accumulated dirt in the detection/removal zone.

15. The system as recited in claim 14, wherein the debris sensor comprises an electromagnetic (EM) wave sensor.

* * * * *